(12) United States Patent
Bae et al.

(10) Patent No.: US 11,759,897 B2
(45) Date of Patent: Sep. 19, 2023

(54) PART ASSEMBLING SYSTEM OF AUTOMATION LINE

(71) Applicants: Hyundai Motor Company, Seoul (KR); Kia Corporation, Seoul (KR)

(72) Inventors: Junhyeok Bae, Ulsan (KR); Seung Yeop Lee, Ulsan (KR); Jung Pyo Kim, Ulsan (KR); Woojong Kim, Ulsan (KR); Jongmin Park, Ulsan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 144 days.

(21) Appl. No.: 17/538,401

(22) Filed: Nov. 30, 2021

(65) Prior Publication Data
US 2022/0324069 A1    Oct. 13, 2022

(30) Foreign Application Priority Data

Apr. 13, 2021    (KR) .................. 10-2021-0047532

(51) Int. Cl.
| | |
|---|---|
| *B23P 19/10* | (2006.01) |
| *B25J 9/00* | (2006.01) |
| *B23P 19/12* | (2006.01) |
| *B23P 21/00* | (2006.01) |
| *B23P 19/00* | (2006.01) |
| *B23P 23/06* | (2006.01) |
| *B23P 19/04* | (2006.01) |

(52) U.S. Cl.
CPC ............. *B23P 19/006* (2013.01); *B23P 19/04* (2013.01); *B23P 19/10* (2013.01); *B23P 19/12* (2013.01); *B23P 23/06* (2013.01); *B25J 9/0096* (2013.01); *B23P 21/002* (2013.01); *B25J 9/0093* (2013.01); *Y10T 29/49899* (2015.01); *Y10T 29/53135* (2015.01); *Y10T 29/53539* (2015.01)

(58) Field of Classification Search
CPC ....... B23P 19/006; B23P 19/12; B23P 21/002; B25J 9/0093; B25J 9/0096; Y10T 29/49899; Y10T 29/53135; Y10T 29/53539
See application file for complete search history.

(56) References Cited

U.S. PATENT DOCUMENTS

| | | | | |
|---|---|---|---|---|
| 9,815,155 | B2 * | 11/2017 | Lin ........................ | B25J 5/007 |
| 2007/0224023 | A1 * | 9/2007 | Cho ...................... | B25J 9/0096 |
| | | | | 414/467 |
| 2008/0253871 | A1 * | 10/2008 | Bergeron .............. | B23P 21/004 |
| | | | | 414/281 |

(Continued)

FOREIGN PATENT DOCUMENTS

| | | | | |
|---|---|---|---|---|
| CN | 110449577 A | * | 11/2019 | ............ B23P 21/004 |
| CN | 111204587 A | * | 5/2020 | ............ B25J 9/0093 |

(Continued)

*Primary Examiner* — Jermie E Cozart
(74) *Attorney, Agent, or Firm* — Fox Rothschild LLP

(57) ABSTRACT

A part assembling system of an automation line includes: a station frame in which a part assembling tool is installed and that includes at least one mounting part; at least one positioner mounted on the at least one mounting part; a part conveying pallet including at least one positioning pin coupled to the at least one positioner; and a moving carriage that transports the part conveying pallet to a predetermined position on a floor of a process work area.

17 Claims, 9 Drawing Sheets

(56) References Cited

U.S. PATENT DOCUMENTS

| | | | |
|---|---|---|---|
| 2016/0089755 A1* | 3/2016 | Kogushi | B25J 9/023 |
| | | | 29/430 |
| 2017/0066592 A1* | 3/2017 | Bastian, II | B25J 5/007 |
| 2020/0218246 A1* | 7/2020 | Wagner | B65G 1/065 |
| 2022/0324069 A1* | 10/2022 | Bae | B23P 21/004 |

FOREIGN PATENT DOCUMENTS

| | | | | |
|---|---|---|---|---|
| CN | 112407099 A | * | 2/2021 | B25J 9/0093 |
| CN | 113118754 A | * | 7/2021 | B23P 19/001 |
| EP | 1524069 A2 | * | 4/2005 | B23P 21/004 |

* cited by examiner

PART ASSEMBLING SYSTEM OF AUTOMATION LINE

CROSS-REFERENCE TO RELATED APPLICATION

This application claims under 35 U.S.C. § 119 the benefit of Korean Patent Application No. 10-2021-0047532 filed in the Korean Intellectual Property Office on Apr. 13, 2021, the entire contents of which are incorporated herein by reference.

BACKGROUND

(a) Technical Field

The present disclosure relates to a part assembling system of an automation line, more particularly, to the part assembling system that may assemble parts in the automation line of a vehicle assembly factory.

(b) Description of the Related Art

Generally, a conveyor is used for conveying and assembling parts in a factory or industrial site. For example, in an automated process line that assembles vehicle parts, design parts are conveyed and assembled through a conveyor.

In such a conveyor, a part position determining station, a direction switching station, and a rotation station are set along a conveying line of parts.

However, in the related art, since it is necessary to change and remodel the stations of the conveyor line according to types of parts, it is disadvantageous in terms of logistics flexibility and facility investment cost of multi-model parts.

The above information disclosed in this Background section is only for enhancement of understanding of the background of the disclosure, and therefore it may contain information that does not form the prior art that is already known in this country to a person of ordinary skill in the art.

SUMMARY

Embodiments of the present disclosure are to provide a part assembling system of an automation line that does not use a conveyor, and instead conveys multi-model parts to a set assembly station, and allows parts to be assembled in the assembly station.

An embodiment of the present disclosure provides a part assembling system of an automation line, including: i) a station frame in which a part assembling tool is installed and that includes at least one mounting part; ii) at least one positioner mounted on the at least one mounting part; iii) a part conveying pallet including at least one positioning pin coupled to the at least one positioner; and iv) a moving carriage that transports the part conveying pallet to a predetermined position on a floor of a process work area.

The station frame may include: at least one base frame provided with the mounting part, at least one vertical frame coupled to an upper surface of the at least one base frame to extend upward, and at least one horizontal frame coupled in a horizontal direction to the at least one vertical frame.

The part assembling tool may be movably installed in the horizontal frame in a predetermined direction.

The station frame may include at least one base frame provided with the mounting part, and a part assembling robot may be installed in each base frame.

The part assembling tool may be mounted on the part assembling robot.

The positioner may include a positioning body mounted on the mounting part.

The positioning body may include a taper-shaped pin guiding groove formed on an upper surface of the positioning body, and a pin coupling hole connected to the pin guiding groove.

The part conveying pallet may include a pallet body formed with at least one carriage coupling hole, and at least one leg that is installed on the pallet body to extend in a downward direction and provided with the positioning pin at a lower end of the at least one leg.

The positioning pin may include a taper part formed at a lower end portion of the positioning pin.

The part conveying pallet may further include at least one part aligning unit installed on an upper surface of the pallet body.

The moving carriage may include a lifter that is movable in an up-down direction.

The part conveying pallet may include a pallet body formed with at least one carriage coupling hole, and the lifter may include a lift pin that is able to be coupled to the carriage coupling hole of the pallet body.

The moving carriage may include an autonomous mobile robot (AMR) that is able to autonomously travel along a predetermined path on a floor of a process work area.

The station frame may further include at least one reinforcement frame connecting the at least two base frames.

Another embodiment of the present disclosure provides a part assembling system of an automation line, including: i) a station frame including a part assembling tool and at least one first mounting part; ii) at least one second mounting part installed on a floor of a process work area; iii) at least one positioner mounted on at least one of at least one first mounting part or at least one second mounting part; iv) a part conveying pallet coupled to the at least one positioner; and v) a moving carriage that transports the part conveying pallet to a predetermined position on the floor of the process work area.

The part assembling system of the automation line may further include a part assembling robot disposed on the station frame and mounted with the part assembling tool.

Another embodiment of the present disclosure provides a part assembling system of an automation line, including: i) a station frame in which a part assembling tool is installed; ii) at least one mounting part installed to be movable in a vertical direction on the station frame; iii) at least one positioner mounted on the at least one mounting part; iv) a part conveying pallet coupled to the at least one positioner; and v) a moving carriage that transports the part conveying pallet to a predetermined position on a floor of a process work area.

The at least one mounting part may be movably installed in the vertical direction on the station frame through a servo motor.

According to the embodiments of the present disclosure, it is possible to secure logistics flexibility and production flexibility of multi-model parts and to reduce equipment investment costs.

In addition, effects that may be obtained or expected from embodiments of the present disclosure are directly or suggestively described in the following detailed description. That is, various effects expected from embodiments of the present disclosure will be described in the following detailed description.

BRIEF DESCRIPTION OF THE DRAWINGS

These drawings are for reference only in describing embodiments of the present disclosure, and therefore, the technical idea of the present disclosure should not be limited to the accompanying drawings.

DETAILED DESCRIPTION OF THE EMBODIMENTS

Figure 1:
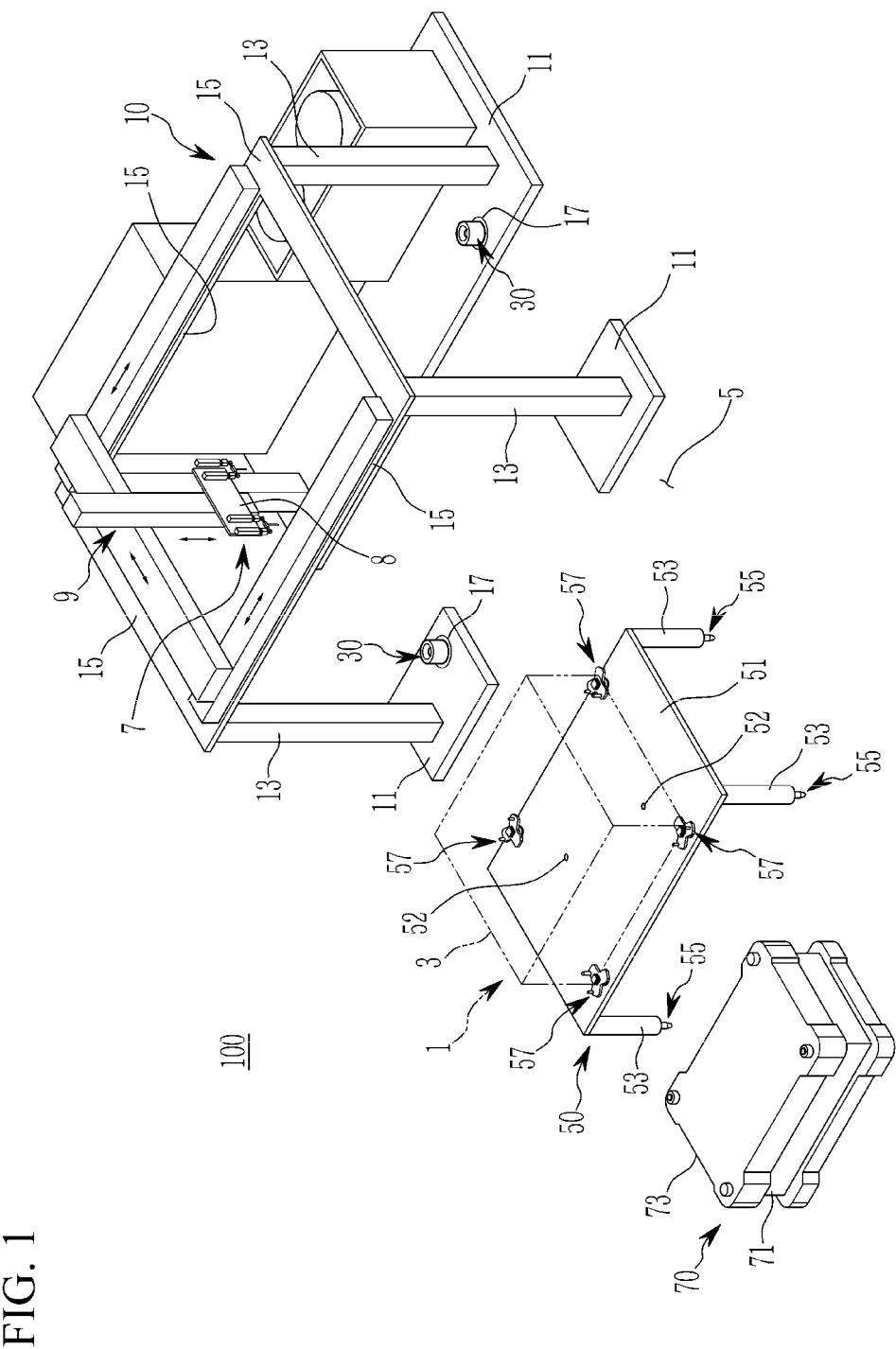
FIG. 1 illustrates a part assembling system of an automation line according to a first embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

Since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Further, in the following detailed description, terms of elements, which are in the same relationship, are divided into "the first", "the second", etc., but the present disclosure is not necessarily limited to the order in the following description.

FIG. 1 illustrates a part assembling system of an automation line according to a first embodiment of the present disclosure.

Referring to FIG. 1, an assembly system 100 of parts in an automation line according to a first embodiment of the present disclosure may be applied to an automation line for automatically assembling various design parts 1 (hereinafter, referred to as 'parts' for convenience) in a vehicle production factory.

Furthermore, the assembly system 100 of the parts in the automation line according to the first embodiment of the present disclosure may be applied to an automation line for automatically assembling an electric vehicle battery 3 as the part 1, for example.

Here, the above-described electric vehicle battery assembly process may be a process of applying a sealer to battery cells mounted in a battery case.

Hereinafter, the following components will be described based on upper and lower directions, and an upper-facing part will be referred to as an upper end part, an upper part, an upper end, and an upper surface, and a lower-facing part will be referred to as a lower end part, a lower part, a lower end, and a lower surface.

In addition, hereinafter, an end (one end or the other end) may be defined as any one end or may be defined as a predetermined portion (one end portion or the other end portion) including the end.

The assembly system 100 of the parts in the automation line according to the first embodiment of the present disclosure may have a structure that does not use a conveyor, conveys the multi-model parts 1 to a predetermined assembly station, and assembles parts in the assembly station.

To this end, the assembly system 100 of the parts in the automation line according to the first embodiment of the present disclosure basically includes a station frame 10, positioners 30, a part conveying pallet 50, and a moving carriage 70.

In the embodiment of the present disclosure, the station frame 10 is installed in each of assembly stations multi-divided in a process work area of an automation line. The station frame 10 is installed on a floor 5 of the process work area in the assembly station. The station frame 10 is mounted with a part assembling tool 7 for assembling the part 1.

The station frame 10 includes base frames 11, vertical frames 13, and horizontal frames 15.

The base frames 11 are provided as a plate type, and are fixed to the floor 5 of the process work area. The base frames 11 include a mounting part 17 for mounting the positioners 30, which will be described further later.

In one example, four vertical frames 13 are provided, and each vertical frame 13 is coupled to an upper surface of the corresponding base frame 11 to extend upward. In addition, four horizontal frames 15 are provided and disposed in a horizontal direction perpendicular to the vertical frames 13, and each horizontal frame 15 is coupled to two adjacent vertical frames 13.

Here, the part assembling tool 7 as described above is movably installed in at least one of the horizontal frames 15 in a predetermined direction. For example, the part assembling tool 7 may include a sealer applying device 8 for applying a sealer to the electric vehicle battery 3 as the part 1.

Furthermore, the sealer applying device 8 may be moved forward and backward, left and right, and up and down by a driving device 9 installed on at least one of the horizontal frames 15. In one example, the driving device 9 includes a plurality of rails respectively extending in a front-rear direction, a left-right direction, and a vertical direction, and the sealer applying device 8 or one rail may be movable on the other rail in an extending direction of the other rail. The driving device 9 capable of moving the sealer applying device 8 forward and backward, left and right, and up and down is well known to a person of ordinary skill in the art, so a further detailed description will be omitted.

In the embodiment of the present disclosure, the positioners 30 are configured to correctly position the part conveying pallet 50, which will be described in detail later, in a predetermined position of the station frame 10.

As an example, four positioners 30 are provided, and each positioner 30 is mounted on a corresponding mounting part 17 of a corresponding base frame 11 in the station frame 10.

Figure 2:
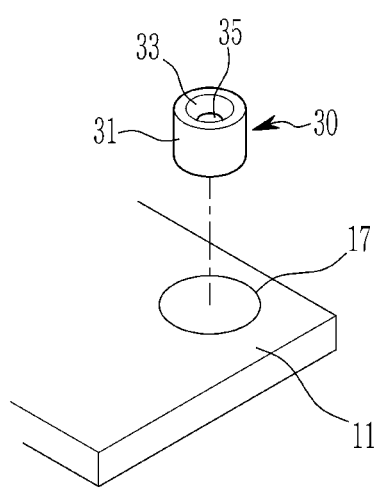
FIG. 2 illustrates a positioner applied to the part assembling system of the automation line according to the first embodiment of the present disclosure.

FIG. 2 illustrates a positioner applied to the part assembling system of the automation line according to the first embodiment of the present disclosure.

Referring to FIGS. 1 and 2, each positioner 30 according to the embodiment of the present disclosure includes a positioning body 31 mounted on the corresponding mounting part 17 of the corresponding base frame 11.

The positioning body 31 may be formed in a circular cylinder shape. For example, the positioning body 31 may be coupled to the mounting part 17 in various ways that are well known to a person of ordinary skill in the art, such as a bonding or bolting method.

The positioning body 31 includes a pin guiding groove 33 formed on an upper surface of the positioning body 31 and a pin coupling hole 35 connected to the pin guiding groove 33.

Here, the pin guiding groove 33 may be formed in a taper shape of which a cross-sectional diameter gradually decreases from an upper end to a lower end. In addition, the pin coupling hole 35 is connected to a lower end of the pin guiding groove 33.

Referring to FIG. 1, the part conveying pallet 50 according to the embodiment of the present disclosure is configured to support the part 1 and to convey the part 1 to a predetermined position of the station frame 10.

Furthermore, the part conveying pallet 50 is provided to be picked up by the moving carriage 70, which will be further described later, and to be movable.

The part conveying pallet 50 includes a pallet body 51, at least one leg 53, at least one positioning pin 55, and at least one part aligning unit 57.

The pallet body 51 is provided, for example, in a shape of a quadrangular plate. The pallet body 51 has an upper surface supporting the part 1 and a lower surface opposite to the upper surface.

The pallet body 51 includes at least one carriage coupling hole 52. As an example, a pair of carriage coupling holes 52 may be formed along a diagonal direction inside an edge of the pallet body 51.

At least one leg 53 is connected to a corner of the lower surface of the pallet body 51 to extend downward. The positioning pin 55 is configured to correctly position the part conveying pallet 50 at a predetermined position of the station frame 10.

Each positioning pin 55 is mounted on a lower end of each leg 53, extends downward, and is coupled to a corresponding positioner 30.

Figure 3:
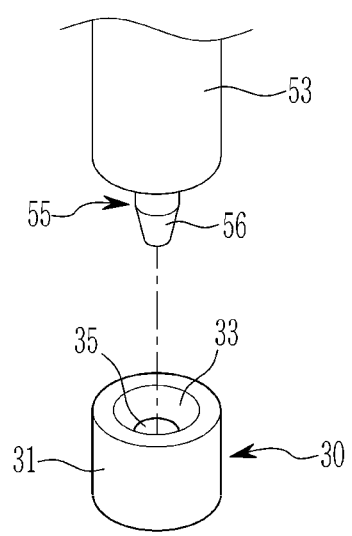
FIG. 3 illustrates a positioning pin of a part conveying pallet applied to the part assembling system of the automation line according to the first embodiment of the present disclosure.

The positioning pin 55 includes a taper part 56 formed at a lower end portion of the positioning pin 55 as shown in FIG. 3. The taper part 56 may be formed in a taper shape of which a cross-sectional diameter gradually decreases from an upper side of the taper part 56 to a lower side of the taper part 56.

The taper part 56 is coupled to the pin coupling hole 35 of the positioner 30. Here, the taper part 56 may be coupled to the pin coupling hole 35 while being guided to the pin coupling hole 35 by the pin guiding groove 33 of the positioner 30.

The part aligning units 57 are configured to correctly position the part 1 by aligning it at a predetermined position on an upper surface of the pallet body 51. As an example, the part aligning units 57 are installed at corners of the upper surface of the pallet body 51, respectively. As another example, the part aligning units 57 are disposed in a diagonal direction on the upper surface of the pallet body 51.

The installation positions of the part aligning units 57 may be changed on the upper surface of the pallet body 51 according to a model of the part 1. For example, the part aligning units 57 are movable in a setting direction on the upper surface of the pallet body 51, or a plurality of installation positions of the part aligning unit 57 are predetermined according to the model of various parts 1 on the upper surface of the pallet body 51, and the part aligning units 57 may be selectively installed in at least one of the plurality of installation positions.

Referring to FIG. 1, the moving carriage 70 according to the embodiment of the present disclosure is configured to move on the floor 5 of the process work area to convey the part conveying pallet 50 to a predetermined position.

The moving carriage 70 may include an autonomous mobile robot (hereinafter referred to as an 'AMR') 71 capable of autonomously driving along a predetermined path on the floor 5 of the process work area.

Figure 4A:
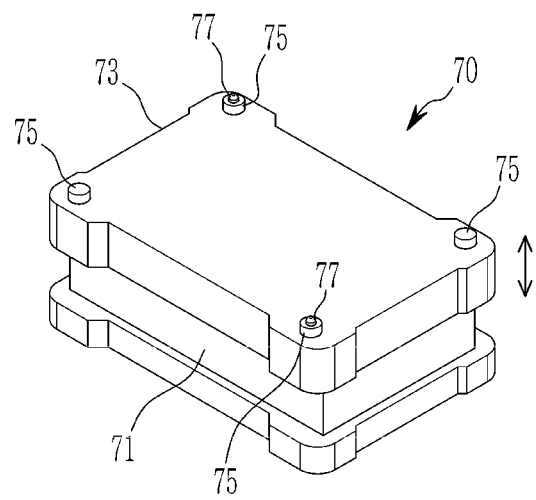
FIGS. 4A and 4B illustrate a moving carriage applied to the part assembling system of the automation line according to the first embodiment of the present disclosure.
Figure 4B:
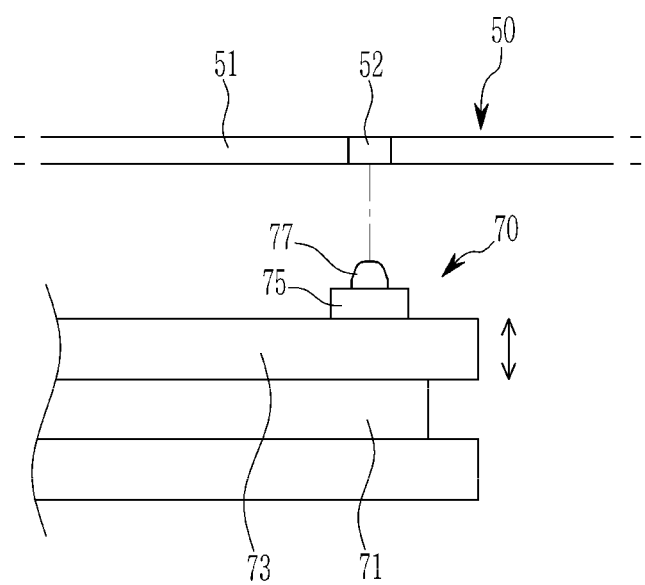

FIGS. 4A and 4B illustrate a moving carriage applied to the part assembling system of the automation line according to the first embodiment of the present disclosure.

Referring to FIGS. 1 and 4A-4B, the AMR 71 according to the embodiment of the present disclosure includes a lifter 73 movable in a vertical direction. The lifter 73 may be provided in a quadrangular block shape.

The lifter 73 may be moved in the vertical direction by a carriage driving device that is well known to those skilled in the art. In addition, at least one lift pad 75 is installed at a corner portion of an upper surface of the lifter 73.

Furthermore, a lift pin 77 may be installed in a pair of the lift pads 75 disposed in a diagonal direction of one of the lift pads 75 along a vertical direction. An upper end portion of the lift pin 77 may be provided in a taper shape.

Here, the lift pad 75 supports a lower surface of the pallet body 51. In addition, the lift pin 77 may be coupled to the carriage coupling hole 52 of the pallet body 51.

As the lifter 73 moves in an upward direction, the lift pin 77 is coupled to the carriage coupling hole 52 of the pallet body 51, and the lifter 73 may move the part conveying pallet 50 in the upward direction. In addition, the lifter 73 may move the part conveying pallet 50 in the lower direction while moving in the lower direction.

Alternatively, the moving carriage 70 according to the embodiment of the present disclosure is not limited to including the AMR 71 as described above, and it may include an automatic guided vehicle (AGV) or manual carriage known to those skilled in the art.

Hereinafter, an operation of the part assembling system 100 of the automation line according to the first embodiment of the present disclosure configured as described above will be described in detail with reference to FIG. 1 to FIG. 4B.

First, the AMR 71 and the part conveying pallet 50 are each positioned in a predetermined area on the floor 5 of the process work area. In this case, the lifter 73 of the AMR 71 may be at least positioned below the pallet body 51.

A part loading device (not shown in the drawing) grips the part 1, such as the electric vehicle battery 3 loaded at a predetermined loading place, and transports them to a predetermined area, and loads the part 1 on the upper surface of the pallet body 51 of the part conveying pallet 50.

Then, at least one part aligning unit 57 of the part conveying pallet 50 aligns the part 1 at a predetermined position on the upper surface of the pallet body 51. In this case, the part aligning unit 57 may align the part 1 while a position of the part aligning unit 57 is automatically or manually changed according to the model of the part 1.

In a state in which the part 1 is aligned on the pallet body 51, the AMR 71 autonomously travels along a predetermined path on the floor 5 of the process work area, and moves to the lower side of the pallet body 51.

Then, the AMR 71 moves the lifter 73 upward to a predetermined position under the pallet body 51.

Accordingly, the lifter 73 supports the lower surface of the pallet body 51 through at least one lift pad 75, and lifts the part conveying pallet 50 in the upper direction. In this case, the lifter 73 may lift the part conveying pallet 50 upward while being coupled to the carriage coupling hole 52 of the pallet body 51 through the lift pin 77.

Next, the AMR 71 autonomously travels along a predetermined path again, and transports the part conveying pallet 50 to a predetermined position of the station frame 10. In this state, the AMR 71 moves the lifter 73 in the downward direction to move the part conveying pallet 50 in the downward direction.

As the part conveying pallet 50 is moved in the downward direction, the taper part 56 of the at least one positioning pin 55 is coupled to the pin coupling hole 35 of the corresponding positioner 30. Here, when a conveying deviation (that is, a difference between a target position and an actual position of the part conveying pallet 50) of the part conveying pallet 50 occurs, the taper part 56 is coupled to the pin coupling hole 35 while being guided to the pin coupling hole 35 by the pin guiding groove 33 of the positioner 30.

Accordingly, the positioner 30 may correctly position the part conveying pallet 50 at a predetermined position of the station frame 10 while being coupled to the positioning pin 55.

As described above, when the part conveying pallet 50 is correctly positioned in the station frame 10, the sealer applying device 8 of the part assembling tool 7 applies the sealer to the part 1 on the part conveying pallet 50 in the station frame 10.

Here, the sealer applying device 8 may apply the sealer while moving forward and backward, left and right, and up and down by the driving device 9 in the station frame 10.

The part assembling system 100 of the automation line according to the first embodiment of the present disclosure as described so far may align the parts 1 of the multiple models on the part conveying pallet 50.

In addition, the part assembling system 100 of the automation line may transport the part conveying pallet 50 to the station frame 10 by the moving carriage 70 such as the AMR 71.

In addition, the part assembling system 100 of the automation line may correctly position the part conveying pallet 50 at the predetermined position of the station frame 10 through the positioner 30 and the positioning pin 55.

Accordingly, the part assembling system 100 of the automation line according to the first embodiment of the present disclosure does not use a conveyor, and may transport the parts 1 of multiple models to the station frame 10, and may assemble the parts 1 in the station frame 10.

Therefore, according to the part assembling system 100 of the automation line according to the first embodiment of the present disclosure, it is possible to secure the logistics flexibility and production flexibility of the parts of the multiple models, and to reduce the equipment investment cost.

Figure 5:
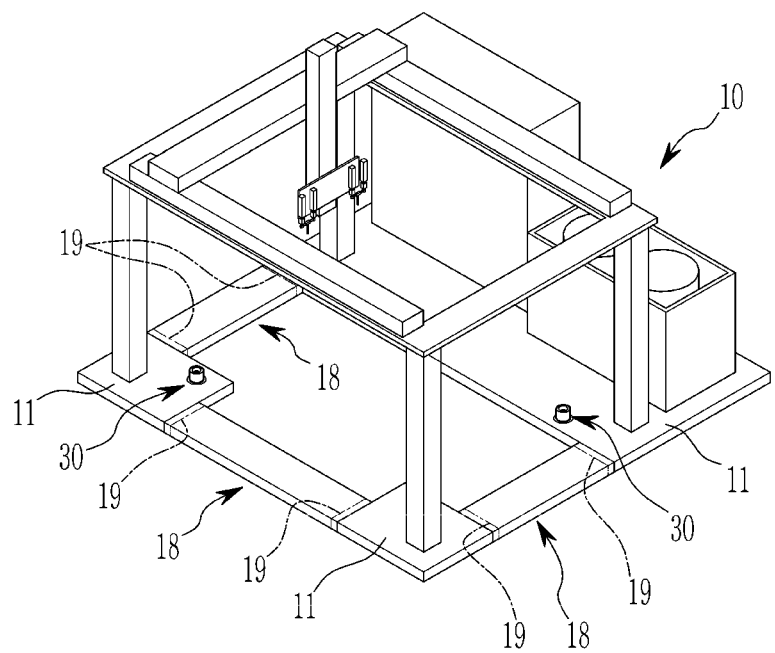
FIG. 5 illustrates a variation of a station frame applied to the part assembling system of the automation line according to the first embodiment of the present disclosure.

FIG. 5 illustrates a variation of a station frame applied to the part assembling system of the automation line according to the first embodiment of the present disclosure.

Referring to FIG. 5, the station frame 10 in the part assembling system 100 of the automation line according to the embodiment of the present disclosure may further include at least one reinforcement frame 18.

Each reinforcement frame 18 is for connecting at least two base frames 11 of the station frame 10 to each other. Each reinforcement frame 18 is disposed between the base frames 11 facing each other. The reinforcement frame 18 may be connected to the base frames 11 facing each other through the connecting parts 19 at both end portions of the reinforcement frame 18.

By connecting the base frames 11 to the reinforcement frame 18 as described above, the reinforcement frame 18 may prevent position dispersion of the positioners 30 due to distortion of the station frame 10 during transportation of the station frame 10.

Accordingly, the part assembling system 100 of the automation line according to the embodiment of the present disclosure may secure positional alignment of the part conveying pallet 50 (see FIG. 1) with respect to the station frame 10 during the part assembling process.

Figure 6:
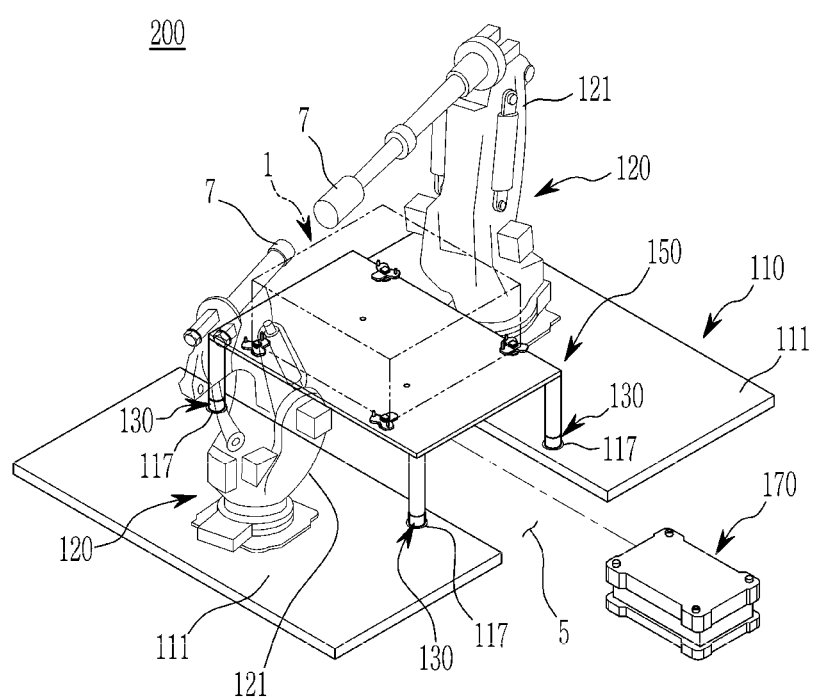
FIG. 6 illustrates a part assembling system of an automation line according to a second embodiment of the present disclosure.

FIG. 6 illustrates a part assembling system of an automation line according to a second embodiment of the present disclosure.

Referring to FIG. 6, a part assembling system 200 of an automation line according to the second embodiment of the present disclosure may include a station frame 110 in which a plurality of part assembling robots 120 are mounted on a plurality of base frames 111, respectively.

As an example, a pair of base frames 111 are disposed on the floor 5 of the process work area at predetermined intervals. Each of the base frames 111 is provided with a mounting part 117 as in the first embodiment. For example, a pair of mounting parts 117 may be provided in each base frame 111. Then, a positioner 130 as in the first embodiment is mounted on each mounting part 117.

In the embodiment of the present disclosure, each part assembling robot 120 is installed on an upper surface of a corresponding base frame 111. The part assembling robot 120 may include a multi-joint robot 121 known to a person of ordinary skill in the art that operates as a robot along a predetermined teaching path within a work radius.

Here, the part assembling tool 7 as in the first embodiment is installed on an arm of the multi joint robot 121. In addition, the above-mentioned positioner 130 is coupled to a part conveying pallet 150 as in the first embodiment.

Furthermore, the part conveying pallet 150 may be transported between the base frames 111 by a moving carriage 170 as in the first embodiment, which autonomously travels in the process work area.

The rest of the configuration and operation effect of the part assembling system 200 of the automation line according to the second embodiment of the present disclosure as described above are the same as in the first embodiment, so a detailed description thereof will be omitted.

Figure 7:
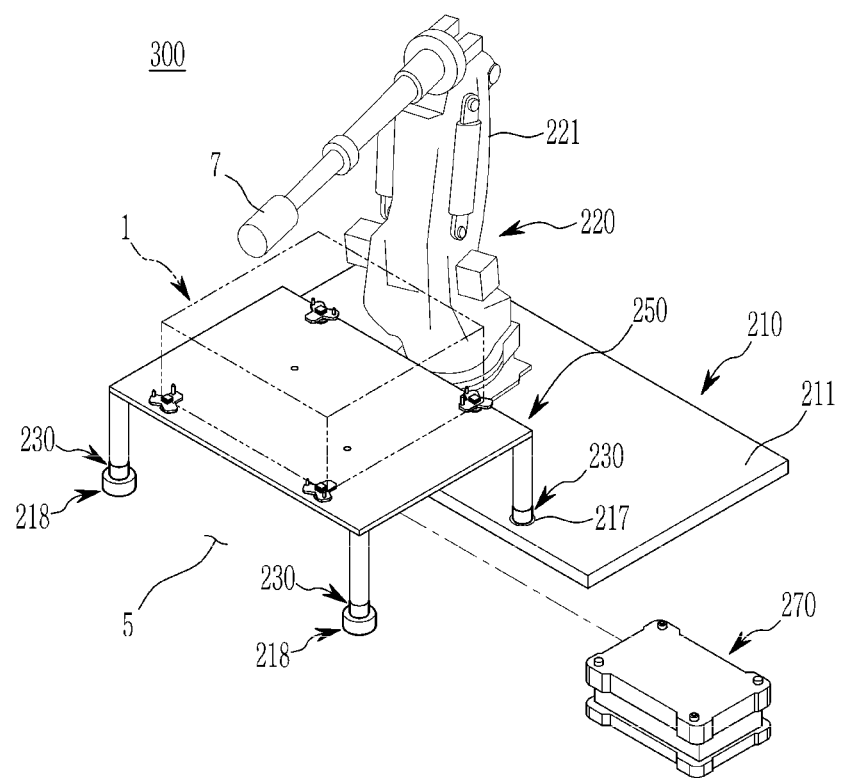
FIG. 7 illustrates a part assembling system of an automation line according to a third embodiment of the present disclosure.

FIG. 7 illustrates a part assembling system of an automation line according to a third embodiment of the present disclosure.

Referring to FIG. 7, a part assembling system 300 of an automation line according to the third embodiment of the present disclosure may include a station frame 210 in which a part assembling robot 220 is mounted on one base frame 211.

Furthermore, the part assembling system 300 of the automation line according to the third embodiment of the present disclosure may include positioners 230 provided in the above-mentioned base frame 211 and the floor 5 of the process work area.

The base frame 211 is fixed to the floor 5 of the process work area. As an example, the base frame 211 is provided with a pair of first mounting parts 217, and the positioner 230 is mounted on each of the first mounting parts 217.

In the embodiment of the present disclosure, the part assembling robot 220 is installed on an upper surface of the base frame 211. The part assembling robot 220 may include a multi joint robot 221 known to a person of ordinary skill in the art that operates as a robot along a predetermined teaching path within a work radius. Here, a part assembling tool 7 as in the second embodiment is installed on an arm of the above-mentioned multi joint robot 221.

As an example, the floor 5 of the process work area is provided with a pair of second mounting parts 218. In addition, the positioner 230 is mounted on each of the second mounting parts 218.

The configurations of the first and second mounting parts 217 and 218 and the positioners 230 as described above are the same as in the previous embodiments. In addition, the positioners 230 as described above are coupled to a part conveying pallet 250 as in the previous embodiments.

Meanwhile, the part conveying pallet 250 as described above may be transported to the base frame 211 side by a moving carriage 270 as in the previous embodiments, which autonomously travels in the process work area.

The rest of the configuration and operation effect of the part assembling system 300 of the automation line according to the third embodiment of the present disclosure as described above are the same as in the previous embodiments, so a detailed description thereof will be omitted.

Figure 8:
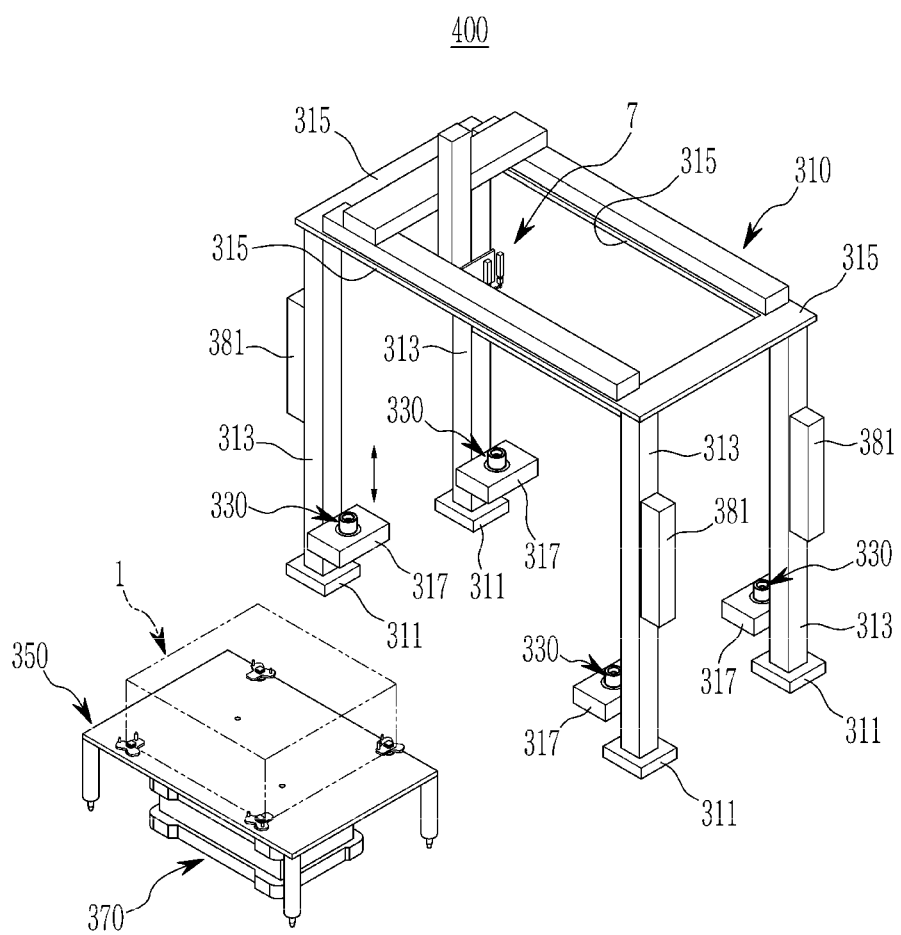
FIG. 8 illustrates a part assembling system of an automation line according to a fourth embodiment of the present disclosure.

FIG. 8 illustrates a part assembling system of an automation line according to a fourth embodiment of the present disclosure.

Referring to FIG. 8, a parts assembling system 400 of an automation line according to the fourth embodiment of the present disclosure may include at least one positioner 330 that is movably installed in a vertical direction to a station frame 310.

The station frame 310 includes base frames 311, vertical frames 313, and horizontal frames 315, as in the first embodiment.

Here, at least one mounting part 317 is provided to be movable in the vertical direction in each of the vertical frames 313. The mounting parts 317 may be installed to be movable in the vertical direction on the vertical frame 313 by a servo motor 381 known to those skilled in the art. In addition, in at least one of the horizontal frames 315, a part assembling tool 7 as in the first embodiment is installed.

Furthermore, the positioner 330 as in the previous embodiments is installed in each mounting part 317. In addition, the above-mentioned positioners 330 are coupled to the part conveying pallet 350 as in the previous embodiments.

Meanwhile, the part conveying pallet 350 as described above may be transported to the station frame 310 side by a moving carriage 370 as in the previous embodiments, which autonomously travels in the process work area.

The rest of the configuration and operation effect of the part assembling system 400 of the automation line according to the fourth embodiment of the present disclosure as described above are the same as in the previous embodiments, so a detailed description thereof will be omitted.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A part assembling system of an automation line, comprising:
   a station frame in which a part assembling tool is installed and that includes at least one mounting part;
   at least one positioner mounted on the at least one mounting part;
   a part conveying pallet including at least one positioning pin coupled to the at least one positioner; and
   a moving carriage that transports the part conveying pallet to a predetermined position on a floor of a process work area.

2. The part assembling system of claim 1, wherein the station frame includes:
   at least one base frame provided with the mounting part, at least one vertical frame coupled to an upper surface of the at least one base frame to extend upward, and at least one horizontal frame coupled in a horizontal direction to the at least one vertical frame.

3. The part assembling system of claim 2, wherein the part assembling tool is movably installed in the horizontal frame in a predetermined direction.

4. The part assembling system of claim 1, wherein:

the station frame includes at least one base frame provided with the mounting part, and a part assembling robot is installed in each base frame.

5. The part assembling system of the automation line of claim 4, wherein the part assembling tool is mounted on the part assembling robot.

6. The part assembling system of the automation line of claim 1, wherein:

the positioner includes a positioning body mounted on the mounting part, and the positioning body includes a taper-shaped pin guiding groove formed on an upper surface of the positioning body, and a pin coupling hole connected to the pin guiding groove.

7. The part assembling system of the automation line of claim 1, wherein the part conveying pallet includes:

a pallet body formed with at least one carriage coupling hole, and at least one leg that is installed on the pallet body to extend in a downward direction and provided with the positioning pin at a lower end of the at least one leg.

8. The part assembling system of the automation line of claim 7, wherein the positioning pin includes a taper part formed at a lower end portion of the positioning pin.

9. The part assembling system of the automation line of claim 7, wherein the part conveying pallet further includes at least one part aligning unit installed on an upper surface of the pallet body.

10. The part assembling system of the automation line of claim 1, wherein the moving carriage includes a lifter that is movable in an up-down direction.

11. The part assembling system of the automation line of claim 10, wherein:

the part conveying pallet includes a pallet body formed with at least one carriage coupling hole, and the lifter includes a lift pin that is able to be coupled to the carriage coupling hole of the pallet body.

12. The part assembling system of the automation line of claim 1, wherein the moving carriage includes an autonomous mobile robot (AMR) that is able to autonomously travel along a predetermined path on a floor of a process work area.

13. The part assembling system of the automation line of claim 2, wherein the station frame further includes at least one reinforcement frame connecting the at least two base frames.

14. A part assembling system of an automation line, comprising:

a station frame including a part assembling tool and at least one first mounting part;

at least one second mounting part installed on a floor of a process work area;

at least one positioner mounted on at least one of at least one first mounting part or at least one second mounting part;

a part conveying pallet coupled to the at least one positioner; and a moving carriage that transports the part conveying pallet to a predetermined position on the floor of the process work area.

15. The part assembling system of the automation line of claim 14, further comprising:

a part assembling robot disposed on the station frame and mounted with the part assembling tool.

16. A part assembling system of an automation line, comprising:

a station frame in which a part assembling tool is installed;

at least one mounting part installed to be movable in a vertical direction on the station frame;

at least one positioner mounted on the at least one mounting part;

a part conveying pallet coupled to the at least one positioner; and a moving carriage that transports the part conveying pallet to a predetermined position on a floor of a process work area.

17. The part assembling system of the automation line of claim 16, wherein the at least one mounting part is movably installed in the vertical direction on the station frame through a servo motor.

* * * * *